(12) United States Patent (10) Patent No.: US 8,115,879 B2
Yamaguchi et al. (45) Date of Patent: Feb. 14, 2012

(54) LIQUID CRYSTAL DISPLAY WITH SLITTED PIXEL ELECTRODES TO ORIENT LIQUID CRYSTAL MATERIAL

(75) Inventors: Hidemasa Yamaguchi, Kanagawa (JP); Shuichi Tatemori, Kanagawa (JP); Masaaki Kabe, Kanagawa (JP); Yosuke Motoyama, Kanagawa (JP); Eiji Sakai, Kanagawa (JP)

(73) Assignee: Sony Corporation, Tokyo (JP)

( * ) Notice: Subject to any disclaimer, the term of this patent is extended or adjusted under 35 U.S.C. 154(b) by 201 days.

(21) Appl. No.: 11/768,511

(22) Filed: Jun. 26, 2007

(65) Prior Publication Data

US 2008/0111932 A1 May 15, 2008

(30) Foreign Application Priority Data

Jun. 30, 2006 (JP) ................................. 2006-180523

(51) Int. Cl.
*G02F 1/1343* (2006.01)
*G02F 1/1335* (2006.01)
(52) U.S. Cl. .......................................... 349/38; 349/114
(58) Field of Classification Search .................. 349/114, 349/38, 39
See application file for complete search history.

(56) References Cited

U.S. PATENT DOCUMENTS

| | | | | |
|---|---|---|---|---|
| 6,853,422 | B2* | 2/2005 | Chung | 349/117 |
| 6,950,160 | B2* | 9/2005 | Kubo et al. | 349/129 |
| 2002/0075436 | A1* | 6/2002 | Kubo et al. | 349/129 |
| 2003/0202139 | A1* | 10/2003 | Choi et al. | 349/113 |
| 2005/0052607 | A1* | 3/2005 | Mori et al. | 349/155 |
| 2005/0122452 | A1* | 6/2005 | Yoshida et al. | 349/114 |
| 2005/0157220 | A1* | 7/2005 | Kim | 349/38 |
| 2005/0185121 | A1* | 8/2005 | Takizawa | 349/114 |
| 2005/0264729 | A1* | 12/2005 | Lin et al. | 349/114 |
| 2006/0033853 | A1* | 2/2006 | Lee et al. | 349/42 |
| 2006/0038946 | A1* | 2/2006 | Yoshida et al. | 349/114 |
| 2006/0055845 | A1* | 3/2006 | Hisatake | 349/98 |
| 2006/0103787 | A1* | 5/2006 | Yun | 349/108 |

FOREIGN PATENT DOCUMENTS

CN 1800927 A * 7/2006

(Continued)

OTHER PUBLICATIONS

Cai et al., Machine Translation of Chinese Patent Application Publication No. CN 1800927 A.*
Japanese Office Action issued on Jul. 19, 2011 in connection with corresponding JP Application No. 2006-180523.

*Primary Examiner* — Mark Robinson
*Assistant Examiner* — Michael Inadomi
(74) *Attorney, Agent, or Firm* — SNR Denton US LLP (57) ABSTRACT

A liquid crystal display has a driving substrate on which transparent pixel electrodes are formed; a counter substrate on which a counter electrode is formed; and a liquid crystal material disposed between the driving and counter substrates. Liquid crystal material molecules are oriented orthogonally to the substrates. The driving substrate has pixel capacitors and pixel transistors formed thereon, with the pixel capacitors disposed under the pixel electrodes. The pixel transistors act to write signal voltages to the pixel electrodes and pixel capacitors. The pixel electrodes have slits formed over the pixel capacitors to orient the the liquid crystal material molecules orthogonally and in a split manner. Each of the pixel capacitors has an electrode for reflecting light and forms a reflective region. Liquid crystal material portions in the reflective regions have a thickness greater than half the thickness of liquid crystal material portions in other transmissive regions.

13 Claims, 7 Drawing Sheets

FOREIGN PATENT DOCUMENTS

| | | |
|---|---|---|
| JP | 2004-157509 | 6/2004 |
| JP | 2004-219796 | 8/2004 |
| JP | 2004-350853 | 12/2004 |
| JP | 2005-524115 | 8/2005 |
| JP | 2006-208942 | 1/2006 |
| JP | 2006-078742 | 3/2006 |

* cited by examiner

LIQUID CRYSTAL DISPLAY WITH SLITTED PIXEL ELECTRODES TO ORIENT LIQUID CRYSTAL MATERIAL

CROSS REFERENCES TO RELATED APPLICATIONS

This application is based upon and claims the benefit of priority from the prior Japanese Patent Application JP 2006-180523, filed in the Japan Patent Office on Jun. 30, 2006, the disclosure of which is hereby incorporated by reference in its entirety.

BACKGROUND OF THE INVENTION

1. Field of the Invention

The present invention relates to a liquid crystal display that can find wide application in various devices including notebook computers, mobile terminals, portable VTRs, and digital still cameras, and more particularly to a liquid crystal display having the functions of both reflective and transmissive types. That is, this liquid crystal display exhibits excellent visibility in both indoors and outdoors. Therefore, this liquid crystal display is suitable as a monitor display for a mobile terminal, a portable VTR, or a digital still camera.

Heretofore, semitransmissive LCDs (liquid crystal displays) having both reflecting function and transmitting function have been developed. Especially, a display device employing a vertically oriented liquid crystal of the semi-transmissive type is described in JP-A-2002-350853 (patent reference 1).

Figure 6A:
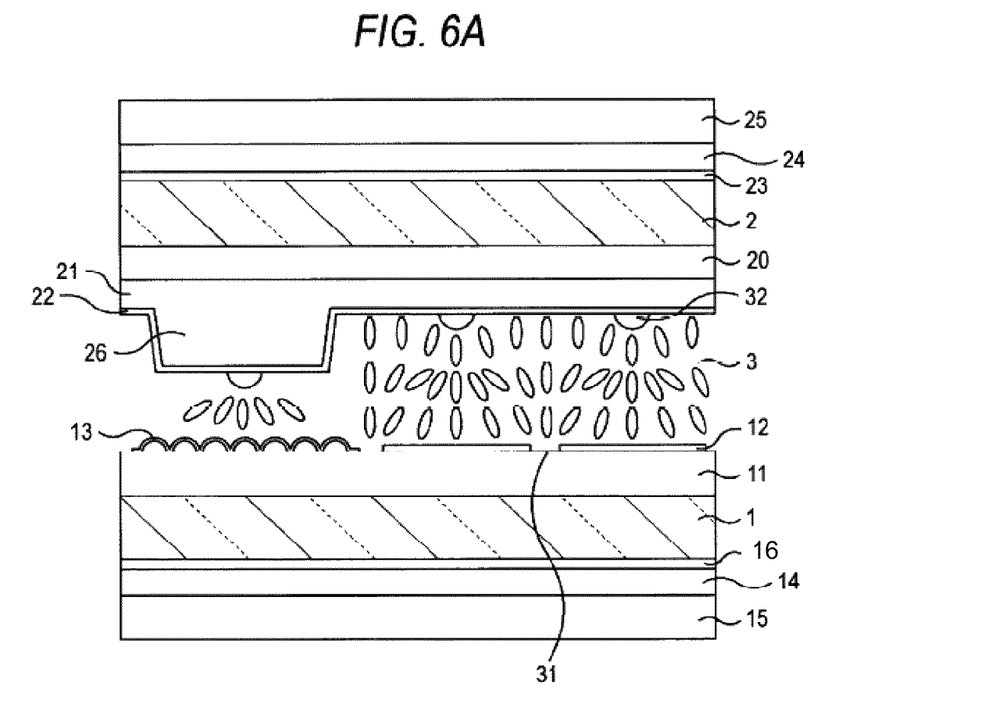
FIG. 6A is a schematic cross-sectional view of a part of one related-art liquid crystal display.
Figure 6B:
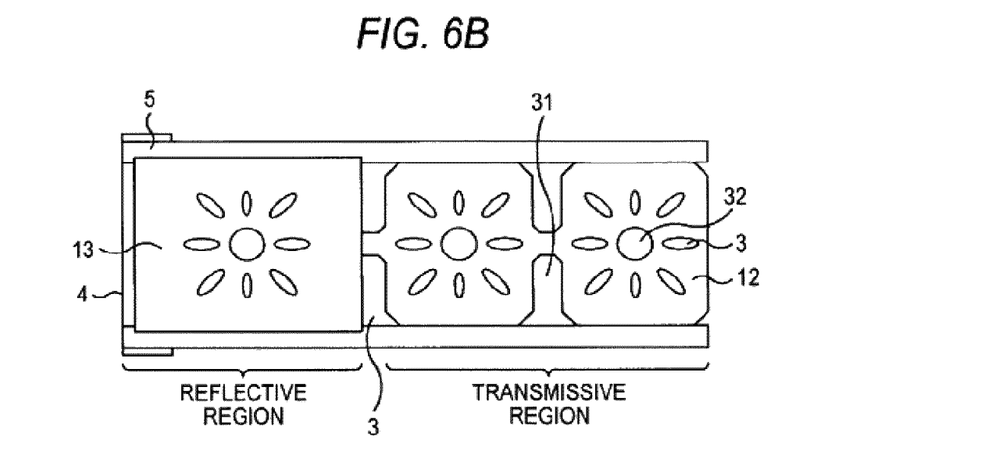
FIG. 6B is a schematic plan view of the part of the LCD shown in FIG. 6A.

FIGS. 6A and 6B show a related-art semitransmissive LCD. FIG. 6A is a schematic cross-sectional view of one pixel of this LCD. FIG. 6B is a schematic plan view of one pixel of the LCD. As shown in FIG. 6A, the LCD fundamentally includes a driving substrate 1, a counter substrate 2, and a liquid crystal material 3. A planarizing film 11 is formed on the inner surface of the driving substrate 1. Transparent pixel electrodes 12 and reflective electrodes 13 are formed on the planarizing film 11. A compensating plate 16, a λ/4 plate 14, and a polarization plate 15 are disposed on the outer surface of the driving substrate 1 that is made of glass or the like.

A color filter array 20 is formed on the inner surface of the counter substrate 2 and coated with a protective film 21. A transparent counter electrode 22 is formed on the protective film. A compensation plate 23, a λ/4 plate 24, and a polarization plate 25 are attached to the outer surface of the counter substrate 2 that is made of glass or the like.

The liquid crystal material 3 is oriented orthogonally to the driving substrate 1 and to the counter substrate 2. Therefore, the upper and lower interfaces in contact with the liquid crystal material 3 are oriented orthogonally in a manner not illustrated. Slits 31 are formed in the transparent pixel electrodes 12 on the side of the driving substrate 1. Protrusions 32 are formed on the surface of the counter electrode 22 on the side of the counter substrate 2. The slits 31 and protrusions 32 cooperate to split the orthogonally oriented liquid crystal material 3 in two dimensions.

As shown in FIG. 6B, each one pixel of the LCD is surrounded by signal lines 4 and gate lines 5. In this pixel, the portion where the transparent pixel electrode 12 is formed constitutes a transmissive region. Meanwhile, the portion where the reflective electrode 13 is formed constitutes a reflective region. As shown, the liquid crystal material 3 is split in two dimensions and oriented orthogonally by the slits 31 and protrusions 32. In the illustrated example, the liquid crystal material 3 in one transmissive region is split into two parts. Similarly, each one reflective region is split and oriented.

Referring again to FIG. 6A, the layer of the liquid crystal material 3 is made different in thickness between the reflective regions and the transmissive regions. For this purpose, a step 26 is added to the thickness of the protective film 21 formed on the side of the counter substrate 2. Because of the presence of the step 26, the thickness of the layer of the liquid crystal material 3 in the reflective regions is half of the thickness of the layer of the liquid crystal material 3 in the transmissive regions. Besides, pixel capacitors (not shown) arranged under the pixel electrodes 12 and pixel transistors (not shown) are formed on the driving substrate 1. The pixel transistors act to write signal voltages to the pixel electrodes 12 and to the pixel capacitors. The gates of the pixel transistors are connected with the gate lines 5. The sources are connected with the signal lines 4. The drains are connected with the pixel electrodes 12 and with the reflective electrodes 13.

SUMMARY OF THE INVENTION

In the related-art LCD shown in FIGS. 6A and 6B, the orthogonally oriented liquid crystal material 3 is split in two dimensions. That is, the slits 31 and protrusions 32 are formed into each pixel to split the orthogonally oriented liquid crystal material 3 in two dimensions, thus producing a wider viewing angle. Generally, the pixel electrodes 12 formed on the side of the driving substrate 1 may need to be patterned according to the shapes of the individual pixels. Accordingly, simultaneously with the patterning, the slits 31 are formed in the pixel electrodes 12 to orient the liquid crystal material 3 in a split manner. To obtain some degree of orientation-restricting force, the width of the slits 31 may need to be increased to some extent. However, a sufficiently high electric field is not applied to the liquid crystal material 3 in the portions of the slits 31. Even if a maximum signal voltage is applied, sufficiently high brightness is not obtained. This leads to a decrease in the transmissivity of the panel.

Furthermore, in order to exhibit sufficient display functions in both reflective and transmissive regions, the thickness of the layer of the liquid crystal material 3 in the reflective regions would need to be set to half of the thickness of the layer of the liquid crystal material 3 in the transmissive regions. This increases the number of manufacturing process steps. Also, the process itself becomes complex. Additionally, the thickness of the layer of the liquid crystal material 3 in the reflective regions is reduced and so the device is affected by foreign matter. This will result in a decrease in the manufacturing yield.

In addition, the reflective electrodes 13 and transparent pixel electrodes 12 may need to be formed by separate process steps for the reflective and transmissive regions. This increases the number of process steps. The aperture ratio of the pixels is reduced by an amount corresponding to the presence of the reflective regions. This deteriorates the transmissivity of the panel.

Figure 7:
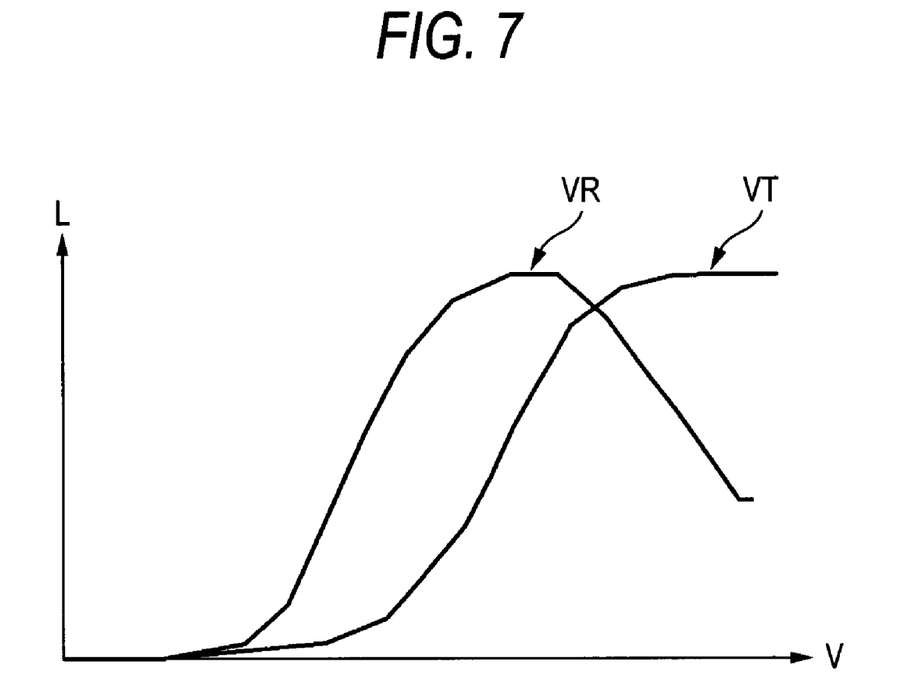
FIG. 7 is a graph showing the signal voltage-brightness characteristics of the LCD shown in FIGS. 6A and 6B.

FIG. 7 is a graph showing the relationship between a signal voltage V applied to each pixel and brightness L. Curve VR indicates the voltage-reflectivity characteristics of the reflective regions. Curve VT indicates the voltage-transmissivity characteristics of the transmissive regions. This graph has been obtained under the condition where the reflective and transmissive regions are uniform in thickness of liquid crystal material. As is obvious from the graph, where the reflective and transmissive regions are made uniform in thickness of liquid crystal material, the voltage-reflectivity curve VR and voltage-transmissivity curve VT are offset from each other. Therefore, even if the same signal voltage V is applied to each pixel, the reflective and transmissive regions become different in brightness L, making it difficult to obtain a correct display. Especially, if the thickness of the layer of the liquid crystal material in the reflective regions is made equal to the thickness of the layer of the liquid crystal material in the transmissive regions, there arises the problem that a peak is produced in the voltage-reflectivity characteristic curve VR.

In particular, when the signal voltage V approaches the maximum level, there arises the problem that the brightness L decreases rather than increases. Therefore, in the related-art LCD shown in FIGS. 6A and 6B, the thickness of the layer of the liquid crystal material 3 in the reflective regions is set to half of the thickness of the layer of the liquid crystal material 3 in the transmissive regions by forming the step 26. However, the formation of the step 26 increases the number of process steps and complicates the process, and the manufacturing yield is deteriorated as described previously.

A structure in which no step is formed on the counter substrate has also been proposed. The counter electrode on the counter substrate is made flat through both reflective and transmissive regions. On the other hand, a dielectric film having a desired thickness is formed between the reflective electrode array on the driving substrate and the layer of the liquid crystal material. The effective voltage applied to the liquid crystal material in the reflective regions is reduced by division of the electrical capacitance utilizing the dielectric film. As a result, the VR curve shown in FIG. 7 can be made to approach the VT curve equivalently. With this method, however, the number of process steps is increased because the dielectric film is formed on the reflective electrode array. Additionally, the presence of the reflective electrodes deteriorates the aperture ratio of the pixels, in the same way as the related-art example shown in FIGS. 6A and 6B.

In view of the foregoing problems with the related-art techniques, it is desirable to provide a semitransmissive liquid crystal display which has a high aperture ratio and which does not need any step.

A liquid crystal display according to one embodiment of the present invention achieves this requirement and has a driving substrate, a counter substrate, and a liquid crystal material disposed between the driving substrate and the counter substrate. Transparent pixel electrodes are formed on the driving substrate. A counter electrode is formed on the counter substrate. The liquid crystal material is oriented orthogonally to the substrates. The driving substrate also has pixel capacitors and pixel transistors acting to write signal voltages to the pixel electrodes and to the pixel capacitors. The pixel capacitors are located under the pixel electrodes. In each pixel electrode, a slit for orienting the liquid crystal material orthogonally and in a split manner is formed over the pixel capacitor. Each of the pixel capacitors has an electrode for reflecting light, thus forming a reflective region. The thickness of the portion of the liquid crystal material present in the reflective region is greater than half of the thickness of the portion of the liquid crystal material present in the transmissive region other than the reflective region.

Preferably, each of the pixel capacitors includes a lower electrode, an upper electrode, and a dielectric substance disposed between the electrodes. The upper electrode is at the same potential as the pixel electrode. In the pixel electrode, the area of the slit formed over the pixel capacitor is equal to or greater than half of the two-dimensional area of the pixel capacitor. The counter substrate has orientation nuclei in contact with the layer of the liquid crystal material. The orientation nuclei cooperate with the slits in each pixel electrode formed on the driving substrate to orient the liquid crystal material orthogonally and in a split manner. In the present embodiment, a polarization plate and a λ/4 plate or a member acting instead of the λ/4 plate are disposed on the driving substrate. Similarly, a polarization plate and a λ/4 plate or a member acting instead of the λ/4 plate are disposed on the counter substrate. In this case, when a maximum signal voltage is applied to the pixel electrode, the portions of the liquid crystal material present in the reflective regions preferably act as λ/4 plates, while the portions present in the transmissive regions act as λ/2 plates.

According to this embodiment of the present invention, in each pixel electrode, the slit for orienting the liquid crystal material orthogonally and in a split manner within a plane is formed over the pixel capacitor. The pixel capacitor is necessary to retain the signal voltage applied to the pixel electrode. Normally, each pixel capacitor uses an electrode made of a metal film and so the pixel capacitor does not transmit light. The slits for split orientation are formed over the pixel capacitors which intrinsically do not contribute to the aperture ratio of the pixels and, therefore, the aperture ratio does not decrease. In the portions of the slits, the orthogonal orientation of the liquid crystal material is disturbed. The slits are placed over the pixel capacitors to secure a sufficient effective aperture ratio of the pixels in such a way that the transmissivity is not affected.

On the other hand, the pixel capacitors have the electrodes for reflecting light. The reflective electrodes are utilized for reflective regions. Therefore, the two-dimensional area of each reflective region is considerably smaller than the two-dimensional area of each transmissive region. Accordingly, the present LCD has relatively small reflective regions and can be termed a slightly reflective type. In recent years, under normal indoor use, emphasis is placed on transmissive display showing excellent contrast. There is a demand for a display device having reflecting performance that functions auxiliarily under bright external light conditions such as in fine weather conditions. Even the slightly reflective type can sufficiently satisfy the requirement from the market. In addition, if the upper part of each pixel capacitor is used for the reflective region, the effective voltage applied to the liquid crystal material is lower than in the transmissive regions where the pixel electrodes are formed. In addition to the decrease in the electric field strength, an oblique electric field is produced and applied. The molecules of the liquid crystal material are tilted along the oblique electric field. The use of these two effects makes it unnecessary to selectively reduce the thickness of the layer of the liquid crystal material in the reflective regions, unlike in the related art. It is possible to match the voltage-reflectivity characteristics and the voltage-transmissivity characteristics. In this way, a wide viewing angle, liquid crystal display (LCD) of the orthogonal orientation and planarly split type can be accomplished while securing a maximum aperture ratio comparable to that of the purely transmissive type. In this LCD, it is not necessary to vary the thickness of the layer of the liquid crystal material between the transmissive and reflective regions. The LCD according to one embodiment of the present invention can be accomplished simply by forming slits in pixel electrodes which are located over pixel capacitors. Additional process steps may not be required. Also, the process is not complicated.

DESCRIPTION OF THE PREFERRED EMBODIMENTS

Figure 1:
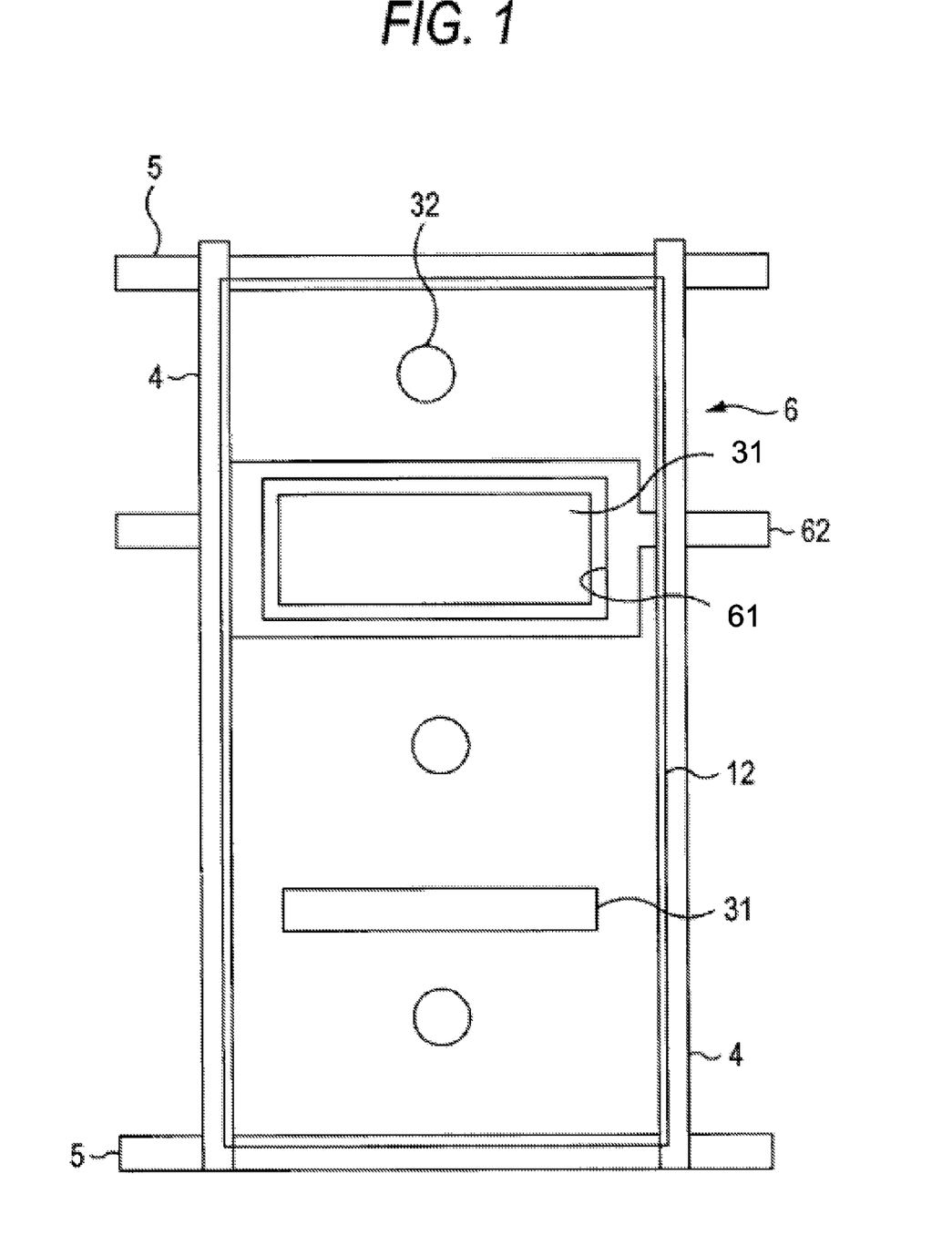
FIG. 1 is a schematic plan view of a part of a liquid crystal display (LCD) according to one embodiment of the present invention.

Embodiments of the present invention are hereinafter described in detail with reference to the drawings. FIG. 1 is a plan view of one pixel of a liquid crystal display (LCD) according to one embodiment of the present invention, showing the fundamental structure of the LCD. As shown, pixels of the LCD are lattice-like cell regions surrounded by columns of signal lines 4 and rows of gate lines 5. One pixel electrode 12 is formed in conformity with one cell region. Thus, one pixel is formed. A pixel capacitor 6 and pixel transistors are formed under the pixel electrode 12. Since the area occupied by the pixel transistors is smaller than the area of the pixel capacitor 6, the pixel transistors are not shown. In the pixel electrode 12, a slit 31 for orienting the liquid crystal material orthogonally and in a split manner is formed over the pixel capacitor 6. Another slit 31 is also formed. In this way, one pixel is trisected by the two slits 31. Correspondingly, three protrusions 32 are formed on the counter substrate. The protrusions act as nuclei of orientation. The molecules of the liquid crystal material are radially oriented from the starting points created by the nuclei. Instead of the protrusions 32, orientational nuclei can be created by hollowing out the transparent electrodes formed on the counter substrate. The pixel capacitor 6 has an electrode that reflects light to form a reflective region. The thickness of the portion of the liquid crystal material present in the reflective region is greater than half of the thickness of the portion of the liquid crystal material present in the transmissive region other than the reflective region. Fundamentally, the thickness of the portion of the liquid crystal material present in the reflective region can be set substantially equal to the thickness of the portion of the liquid crystal material present in the transmissive region.

The pixel capacitor 6 includes an upper electrode 61, a lower electrode 62, and a dielectric substance disposed between the electrodes 61 and 62. The upper electrode 61 is connected with the pixel electrode 12 via an interconnect (not shown), and is at the same potential as the pixel electrode 12. Note that the present invention is not limited to this structure. It is not always necessary that the upper electrode 61 and pixel electrode 12 be at equipotential. In the pixel electrode 12, the area of the slit 31 formed over the pixel capacitor 6 is equal to or greater than half of the two-dimensional area of the pixel capacitor 6. The reflective region can be secured maximally by approaching the area of the slit 31 to the two-dimensional area of the pixel capacitor 6 as much as possible. The orientation can be controlled more strongly by maximizing the area of the slit in this way.

Figure 2:
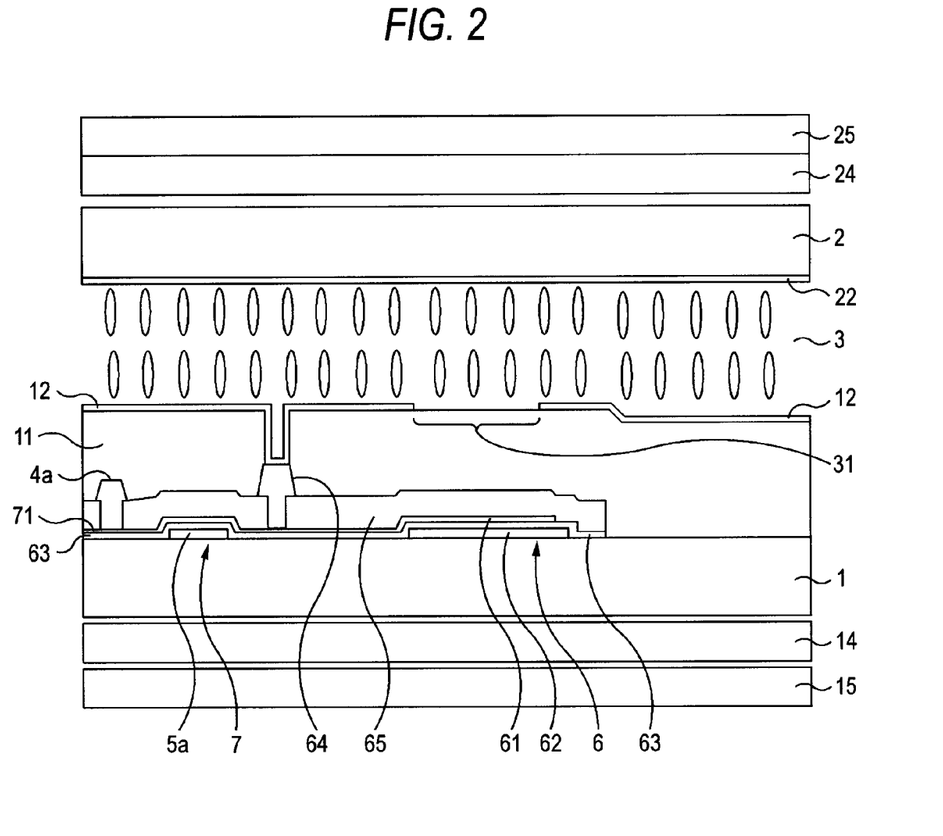
FIG. 2 is a schematic cross section of the part of the LCD shown in FIG. 1.

FIG. 2 is a schematic cross section of the liquid crystal display shown in FIG. 1 under the condition in which no voltage is applied. As shown, the present liquid crystal display includes a driving substrate 1, a counter substrate 2, and a liquid crystal material 3 disposed between the driving substrate 1 and the counter substrate 2. The liquid crystal material 3 is oriented orthogonally to the substrates. Transparent pixel electrodes 12 are formed on the driving substrate 1. A counter electrode 22 is formed on the counter substrate 2.

A pixel capacitor 6 disposed under the pixel electrode 12 and pixel transistors 7 for writing signal voltages to the pixel electrode 12 and pixel capacitor 6 are formed on the driving substrate 1. The pixel capacitor 6 includes a lower electrode 62, an upper electrode 61, and a dielectric substance 63 disposed between the electrodes 62 and 61. The upper electrode 61 is at the same potential as the pixel electrode 12. In the pixel electrode 12, a slit 31 for orienting the liquid crystal material 3 orthogonally and in a split manner is formed over the pixel capacitor 6. The pixel electrode 12 and pixel capacitor 6 are vertically separated by a planarizing film 11. The pixel capacitor 6 has an electrode for reflecting light and forms a reflective region. The thickness of the portion of the liquid crystal material 3 present in the reflective region is greater than half of the thickness of the portion of the liquid crystal material 3 present in the transmissive region other than the reflective region. Typically, the thickness of the portion of the liquid crystal material 3 present in the reflective region can be set substantially equal to the thickness of the portion of the liquid crystal material 3 present in the transmissive region. In other words, the gap between the driving substrate 1 and counter substrate 2 can be made uniform through the reflective and transmissive regions.

Each pixel transistor 7 includes a gate electrode 5a, a gate insulator film 63, and a semiconductor thin film 71 made of a film of polycrystalline silicon. The gate electrode 5a is connected with the gate line 5. In the present embodiment, the gate electrode 5a and the lower electrode 62 of the pixel capacitor 6 are made of a metal film of the same layer. Accordingly, the lower electrode 62 is a reflective electrode. The gate insulator film 63 of the pixel transistor 7 is in the same layer as the dielectric film 63 of the pixel capacitor 6. A part of the semiconductor thin film 71 forming the device region of the pixel transistor 7 extends, forming the upper electrode 61 of the pixel capacitor 6. The pixel transistor 7 and pixel capacitor 6 constructed in this way are coated with an interlayer dielectric film 65.

A source electrode 4a and a drain electrode 64 are formed over the interlayer dielectric film 65. The source electrode 4a is connected with the source region of the pixel transistor 7 via a contact hole formed in the interlayer dielectric film 65. The source electrode 4a is also connected with the signal line 4. On the other hand, the drain electrode 64 is connected with the drain region of the pixel transistor 7 via a contact hole extending into the interlayer dielectric film 65. The drain electrode 64 is connected with the pixel electrode 12 via a contact hole formed in the planarizing film 11. Therefore, the upper electrode 61 of the pixel capacitor 6 is connected with the pixel electrode 12 via both the semiconductor thin film 71 and the drain electrode 64 and thus the upper electrode 61 and the pixel electrode 12 are at equipotential.

A polarization plate 15 and a λ/4 plate 14 are disposed on a side of the driving substrate 1. Similarly, a polarization plate 25 and a λ/4 plate 24 are disposed on a side of the counter substrate 2. In this arrangement, the present liquid crystal display operates in normally black mode. That is, when no voltage is applied, all pixels in the reflective and transmissive regions exhibit black. A color filter array (not shown) is mounted on the counter substrate 2.

With respect to the reflective region, incident light is reflected by the reflective region of the driving substrate 1 and passes through the λ/4 plate 24 twice and so the linearly polarized light is rotated through 90°. That is, the linearly polarized light entering from the polarization plate 25 does not exit at all. The black level seems deep and high contrast can be obtained. The liquid crystal material 3 is oriented orthogonally. In the orthogonal orientation, the molecules of the liquid crystal material are oriented orthogonally when the electric field is OFF. Therefore, there is no retardation. Consequently, the reflective region operates in normally black mode.

Where the reflective region is designed to operate in normally black mode, it is, of course, necessary to design the transmissive region to operate in normally black mode similarly. For this purpose, a λ/4 plate 14 that is exactly equivalent to the λ/4 plate 24 placed on a side of the counter substrate 2 is rotated through 90° and disposed on a side of the driving substrate 1. Light emerging from a backlight (not shown) is converted into linearly polarized light by the polarization plate 15. The light is then converted into circularly polarized light by the λ/4 plate 14. When the light then passes through the liquid crystal material 3, there is no phase difference because the molecules of the liquid crystal material are oriented orthogonally. The state of polarization remains unchanged. Then, the light passes through the λ/4 plate 24 on the front surface side, the optical axis of the λ/4 plate 24 being rotated through 90° with respect to the λ/4 plate 14. At this time, the circularly polarized light is converted into linearly polarized light. The direction of polarization is exactly the same as the direction assumed when the light passed through the polarization plate 15. Because the polarization plates 15 and 25 are orthogonal to each other, the light is not transmitted through the polarization plate 25 and thus black is exhibited. The level of the black produced at this time is equivalent to the level of black obtained when polarization plates are arranged in a crossed Nicols configuration. The intensity of transmitted black light is very small. In transmissive mode, high contrast can be easily obtained.

It is to be understood that the present invention is not limited to the above structure. The device can be operated in normally black mode by placing λ/4 plates 14 and 24 and the polarization plates 15 and 25 in a parallel relation to each other without placing the λ/4 plates 14, 24 and polarization plates 15, 25 orthogonal to each other (at 90°) as described previously. The principle can be realized by forming a λ/2 plate from two λ/4 plates to rotate the incident linearly polarized light through 90°. A λ/4 plate is an optical member having a function of converting linearly polarized light into substantially circularly polarized light. In some cases, plural phase difference plates are combined to achieve the function of a λ/4 plate. In the embodiment of the present invention, a member to which the function of a λ/4 plate is imparted by combining plural phase difference plates may be used as a λ/4 plate. Especially, a phase difference configuration may be attained more preferably by obtaining the function of a λ/4 plate over a wide range of the whole visible region by combining λ/2 and λ/4 plates.

Figure 3:
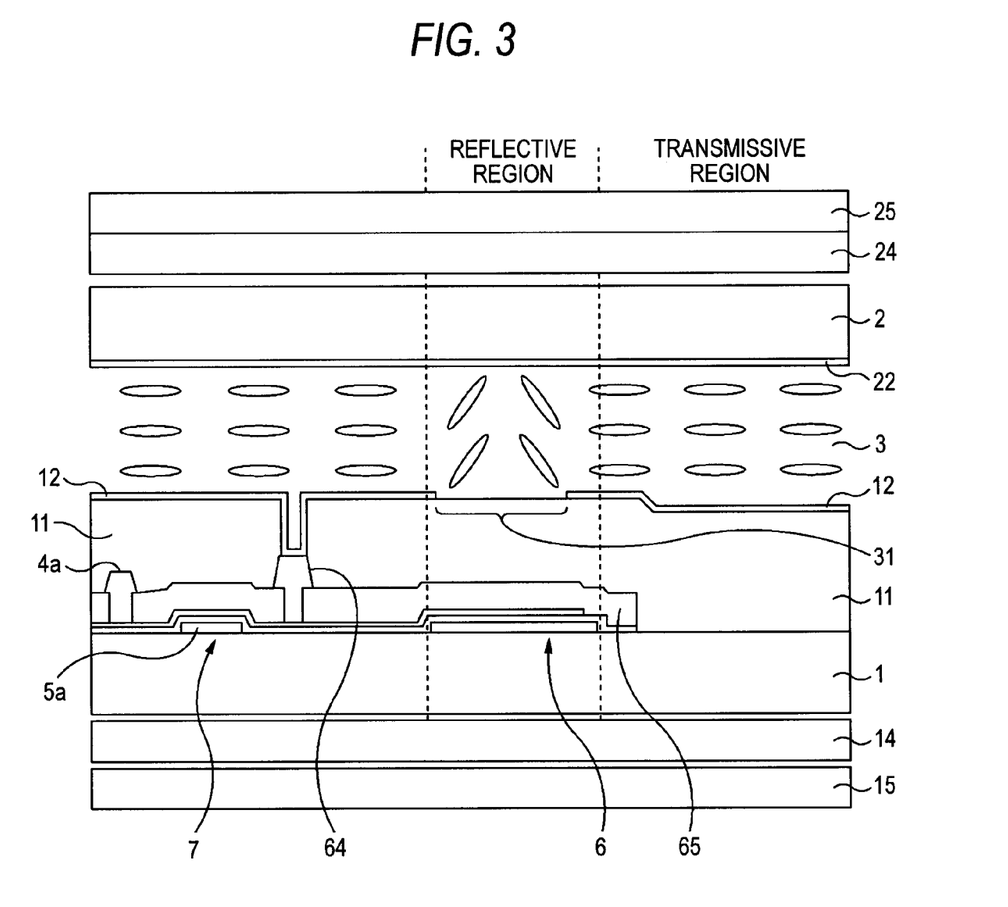
FIG. 3 is a schematic cross section similar to FIG. 2 but showing a different state.

FIG. 3 is a schematic cross section of the liquid crystal display in a condition where a voltage is applied. In normally black mode, each pixel is made to exhibit white by application of the voltage. In the transmissive region, when a signal voltage is applied, the liquid crystal material 3 shifts from orthogonal orientation to multiaxial orientation and acts as a λ/2 phase difference plate. The multiaxial orientation is a state in which the molecules of the liquid crystal material have fundamentally shifted from orthogonal orientation either to tilted orientation or to horizontal orientation and the individual molecules of the liquid crystal material are oriented radially in the split regions. When the liquid crystal material 3 functions as a λ/2 plate, the incident linearly polarized light is rotated through 90° and linearly polarized light is produced as outgoing light. The outgoing light passes through the polarization plate 25 on the surface side. Consequently, a white display is obtained. In the reflective region, when a voltage is applied, the liquid crystal material 3 shifts from orthogonal orientation to tilted orientation and acts as a λ/4 plate. Because the light reciprocates through the reflective region, the liquid crystal material 3 is eventually equivalent to a λ/2 plate for reciprocation of light in the same way as the transmissive region. The incident linearly polarized light is rotated through 90° and then reciprocates through the λ/4 plate 24. Consequently, the light is rotated through 90°, and linearly polarized light is produced as outgoing light. The light then passes through the polarization plate 25 on the front surface side. As a result, a white display is obtained. In this way, when a maximum signal voltage is applied to the pixel electrode 12, the portion of the liquid crystal material 3 present in the reflective region functions as a λ/4 plate. The portion present in the transmissive region functions as a λ/2 plate.

As is obvious from the description provided so far, in the embodiment of the present invention, the slits 31 are placed over the pixel capacitors 6 to effectively use the slits 31 which are used to orient and split the orthogonally oriented liquid crystal material 3. Since the slits 31 are placed over the pixel capacitors 6 that are not openings intrinsically, the transmissivity is not deteriorated. If the slits 31 are about 5 μm in width, an orientation-restricting force for division within a plane may be normally obtained. However, the orientation-splitting performance is enhanced with increasing the width. Therefore, as shown in FIG. 1, the slit 31 placed over each pixel capacitor 6 is preferably widened maximally. Where the area of each slit 31 is at least equal to or more than half (more preferably, equal to or more than 80%) of the two-dimensional area of the pixel capacitor 6, desirable results are obtained. As a result, the orientation-splitting force is increased. Also, the range acting as the reflective region is enlarged.

As shown in FIG. 2, the lower electrode 62 of the pixel capacitor 6 is made of a metal. The upper electrode 61 is a semiconductor thin film such as polycrystalline silicon. A dielectric film 63 is sandwiched between the electrodes. The upper electrode 61 is at the same potential as the pixel electrode 12. Because the pixel electrode 12 does not exist in the portion of the slit 31, no voltage is applied like a transmissive region. Because of mixing of a lateral electric field from the surroundings and an electric field from the upper electrode 61, an oblique electric field is applied to the liquid crystal material 3 to some extent. The boundary of orientation division is around the center of the slit 31. Combination of these effects obliquely orients the liquid crystal material 3 present in the reflective region. The liquid crystal material 3 functions like a λ/4 plate. As a result, on the average, the voltage-reflectivity characteristic curve VR of the liquid crystal material in the reflective region agrees with the voltage-transmissivity characteristic curve VT of the liquid crystal material in the transmissive region. In the present embodiment, the upper electrode 61 of the pixel capacitor 6 is made of a film of polycrystalline silicon. Instead, the upper electrode may be made of a metal layer. The lower electrode 62 of the pixel capacitor 6 is normally made of a metal to reduce the resistivity. Intrinsically, the lower electrode does not form an opening. In the present image display device, this metal electrode is used as a reflective plate and so it is not necessary to form a separate metal member acting as a reflective plate.

With the structure shown in FIG. 1, the reflective region is limited to equal to or less than the two-dimensional area of the pixel capacitor. Consequently, a slightly reflective type having relatively small reflective regions is obtained. In recent years, under normal indoor use, emphasis is placed on the transmissive mode showing excellent contrast. There is a demand for a slightly reflective liquid crystal display having the reflective mode that functions auxiliarily under bright external light conditions such as in fine weather conditions. Therefore, even the slightly reflective type can sufficiently satisfy the requirement from the market. In order to obtain a higher reflectivity, the area of the metal electrode of the pixel capacitor may be positively increased. Alternatively, the color filter array may be removed from the reflective regions of the counter substrate. Furthermore, a light-scattering layer maybe formed over the reflective regions. A scattering function may be imparted to the paste with which the polarization plate 25 is bonded. Moreover, a light-scattering layer may be formed between the color filter array and the layer of the liquid crystal material 3. Additionally, a scattering layer may be patterned only in the reflective regions. This can improve the reflecting performance. In some cases, an uneven layer may be formed under the pixel capacitor 6 and used as a scattering reflective plate.

As shown in FIGS. 2 and 3, polarization plates 15 and 25 are disposed such that the liquid crystal material 3 is sandwiched vertically between the polarization plates. Thus, an orthogonally oriented liquid crystal display having a high transmissivity is obtained. Each of the polarization plates is preferably a wide-range circularly polarizing plate acting as a circularly polarizing plate in the visible wavelength range. To obtain a wider viewing angle, a compensation plate, known as a C-Plate, having a small refractive index nz in the normal direction or a biaxial compensation plate satisfying the relationship nx≧ny>nz may be inserted.

Figure 4:
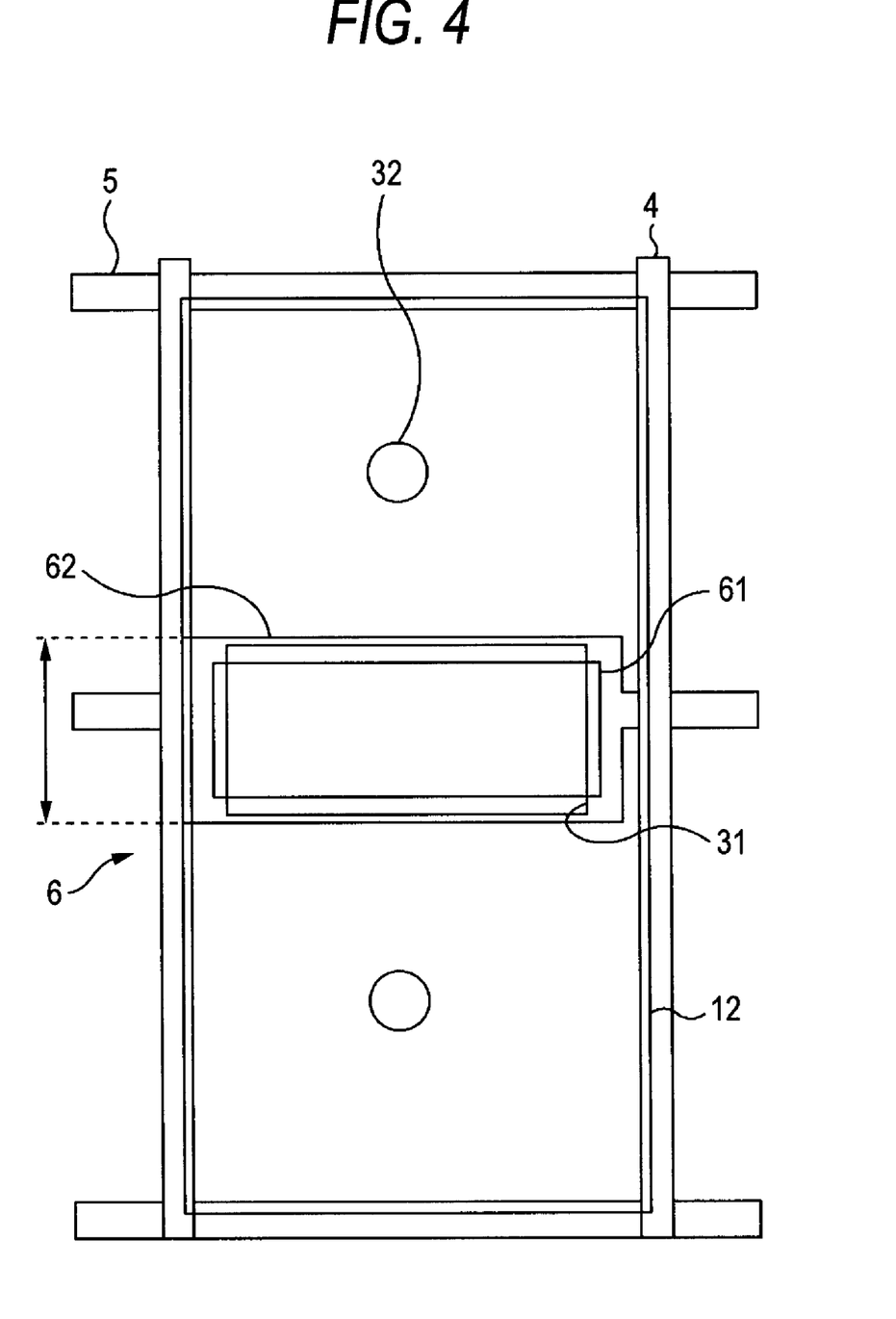
FIG. 4 is a schematic plan view of a part of a liquid crystal display according to one specific embodiment of the present invention.
Figure 5:
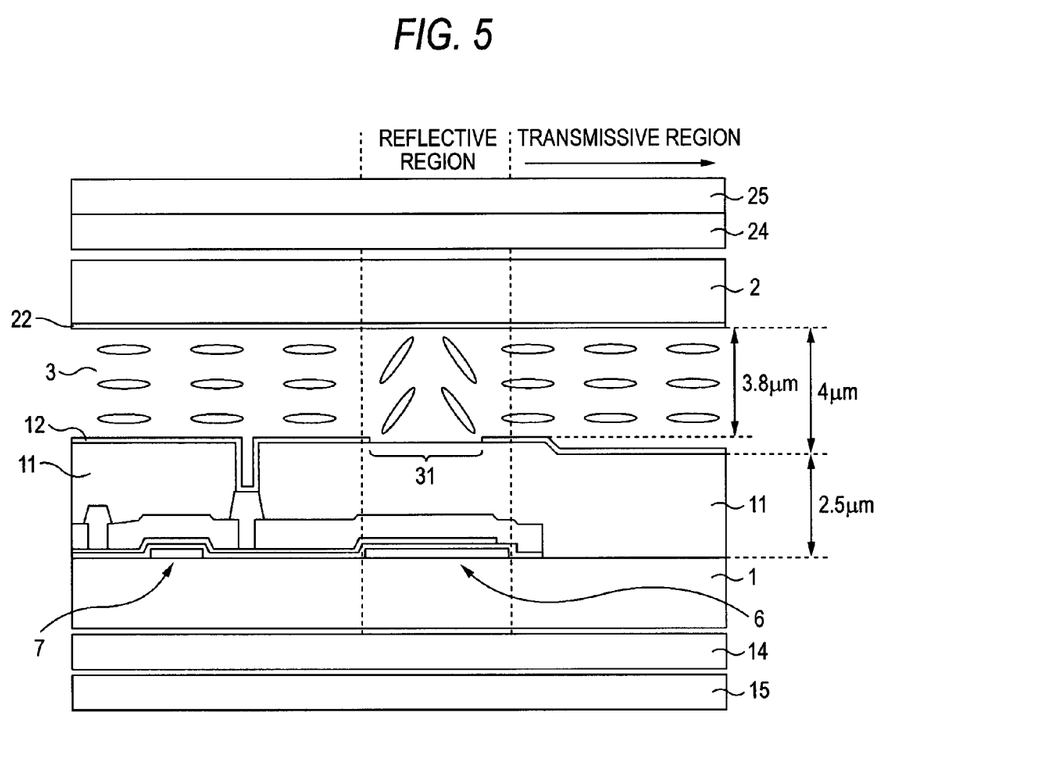
FIG. 5 is a schematic cross section of the part of the LCD shown in FIG. 4.

Finally, an example of the present invention is described in detail by referring to FIGS. 4 and 5. FIG. 4 is a plan view of one pixel of the example. FIG. 5 is a cross-sectional of the one pixel of the example. As shown in FIG. 4, in the present example, each pixel measures 45 µm in width×135 µm in height. Signal lines 4 partitioning the individual pixels have a widthwise dimension of 9 µm. On the other hand, gate lines 5 have a widthwise dimension of 6 µm. A pixel capacitor 6 is disposed in the center of each pixel. A slit 31 is disposed over the pixel capacitor 6. Consequently, the pixel electrode 12 is vertically split into two. Two protrusions 32 are formed on the counter substrate in a corresponding manner to the two parts of the pixel electrode 12. Each protrusion 32 has a diameter of 10 µm and a height of 1 µm. The slit 31 measures 23 µm×29 µm. The widthwise dimension of the pixel capacitor 6 is 25 µm. The upper electrode 61 measures 23 µm×31 µm.

Referring next to FIG. 5, the absorption axis of the upper polarization plate 25 is set to 0°. The phase delay axis of the λ/4 plate 24 is set to 45°. The absorption axis of the lower polarization plate 15 is set to 90°. The phase delay axis of the λ/4 plate 14 is set to 135°. The thickness of the layer of the liquid crystal material 3 present in the reflective region is 3.8 µm. The thickness of the layer of the liquid crystal material 3 present in the transmissive region is 4 µm. In this way, the layer of the liquid crystal material 3 is substantially uniform in thickness through both reflective and transmissive regions. The thickness of the planarizing film 11 interposed between the slit 31 and the pixel capacitor 6 is 2.5 µm. The liquid crystal material 3 is oriented orthogonally. The refractive index anisotropy (Δn) of the material is 0.1. The dielectric anisotropy Δ∈=−4.

When black was exhibited, a signal voltage of 1 V was applied to the layer of the liquid crystal material 3. When white was exhibited, a signal voltage of 4.5 V was applied to the layer of the liquid crystal material 3. When a gray was displayed, a voltage between 1 V and 4.5 V was applied according to the gray level. When white or a gray was displayed, the liquid crystal material 3 was oriented in a split manner by cooperation of the slit 31 and protrusions 32. The transmissive characteristics showed a wide viewing angle. When an image was displayed without lighting up the backlight, the reflective characteristics were such that images and alphanumerical characters could be sufficiently recognized outdoors under strong external light conditions.

It should be understood by those skilled in the art that various modifications, combinations, sub-combinations and alterations may occur depending on design requirements and other factors insofar as they are within the scope of the appended claims or the equivalents thereof.

What is claimed is:
1. A liquid crystal display comprising:
 a driving substrate on which transparent pixel electrodes are formed;
 a counter substrate on which a counter electrode is formed; and
 a liquid crystal material disposed between the driving substrate and the counter substrate, molecules of the liquid crystal material being oriented orthogonally to the substrates,
 wherein,
  the driving substrate has pixel capacitors and pixel transistors formed thereon, the pixel capacitors being disposed under the pixel electrodes, each pixel capacitor has a pair of pixel capacitor electrodes disposed over each other and a dielectric substance disposed between the pair of pixel capacitor electrodes, the pixel transistors acting to write signal voltages to the pixel electrodes and to the pixel capacitors,
  each pixel electrode has a slit formed over the pair of pixel capacitor electrodes of a respective one of the pixel capacitors to orient the molecules of the liquid crystal material to be (a) orthogonal to the substrates when no voltage is applied to the pixel electrode and (b) non-orthogonal to the substrates when a respective signal voltage is written to the respective one of the pixel electrodes,
  each pixel electrode also having another slit which together with the slit formed over the pixel electrodes of a respective one of the pixel capacitors divides the pixel into three parts,
  one of the pair of pixel capacitor electrodes of each of the pixel capacitors reflects light and forms a reflective region,
  a thickness of portions of the liquid crystal material present in the reflective regions is greater than half of a thickness of portions of the liquid crystal material present in transmissive regions other than the reflective regions, and in each of the pixel electrodes, the area of the slit formed over the pixel capacitor is equal to or greater than half of the two-dimensional area of the pixel capacitor.
2. A liquid crystal display of claim 1, wherein an upper one of each pair of pixel capacitor electrodes is at the same potential as the pixel electrode having the slit.

3. A liquid crystal display of claim 1, wherein the counter substrate has orientation nuclei in contact with the liquid crystal material, wherein the orientation nuclei cooperate with the slits formed in the pixel electrodes to orient the molecules of the liquid crystal material to be non-orthogonal to the substrates when the respective signal voltage is written to the respective one of the pixel electrodes.

4. A liquid crystal display of claim 1, wherein a polarization plate and a λ/4 plate or a member functioning as a λ/4 plate are disposed on the driving substrate, and wherein a polarization plate and a λ/4 plate or a member functioning as a λ/4 plate are disposed on the counter substrate.

5. A liquid crystal display of claim 1, wherein a lower one of each pair of the pixel capacitor electrodes reflects light and defines the reflective region.

6. A liquid crystal display of claim 5, wherein the lower one of each pair of pixel capacitor electrodes is formed on a same layer as a metal electrode layer of each pixel transistor.

7. A liquid crystal display of claim 5, wherein an upper one of each pair of pixel capacitor electrodes is formed on a same layer as a semiconductor layer of each pixel transistor.

8. A liquid crystal display comprising:
a driving substrate on which transparent pixel electrodes are formed;
a counter substrate on which a counter electrode is formed; and
a liquid crystal material disposed between the driving substrate and the counter substrate, molecules of the liquid crystal material being oriented orthogonally to the substrates,
wherein,
the driving substrate has pixel capacitors and pixel transistors formed thereon, the pixel capacitors being disposed under the pixel electrodes, each pixel capacitor has a pair of pixel capacitor electrodes disposed over each other and a dielectric substance disposed between the pair of pixel capacitor electrodes, the pixel transistors acting to write signal voltages to the pixel electrodes and to the pixel capacitors,
each pixel electrode has a slit formed over the pair of pixel capacitor electrodes of a respective one of the pixel capacitors to orient the molecules of the liquid crystal material to be (a) orthogonal to the substrates when no voltage is applied to the pixel electrode and (b) non-orthogonal to the substrates when a respective signal voltage is written to the respective one of the pixel electrodes,
each pixel electrode also having another slit which together with the slit formed over the pixel capacitor electrodes of a respective one of the pixel capacitors divides the pixel into three parts,
one of the pair of pixel capacitor electrodes of each of the pixel capacitors reflects light and forms a reflective region, and
a thickness of portions of the liquid crystal material present in the reflective regions is greater than half of a thickness of portions of the liquid crystal material present in transmissive regions other than the reflective regions,
a polarization plate and a λ/4 plate or a member functioning as a λ/4 plate are disposed on the driving substrate, and wherein a polarization plate and a λ/4 plate or a member functioning as a λ/4 plate are disposed on the counter substrate, and
when a maximum signal voltage is applied to the pixel electrodes, portions of the liquid crystal material present in the reflective regions act as a λ/4 plate and portions of the liquid crystal material present in the transmissive regions act as a λ/2 plate.

9. A liquid crystal display of claim 8, wherein an upper one of each pair of pixel capacitor electrodes is at the same potential as the pixel electrode having the slit.

10. A liquid crystal display of claim 8, wherein the counter substrate has orientation nuclei in contact with the liquid crystal material, wherein the orientation nuclei cooperate with the slits formed in the pixel electrodes to orient the molecules of the liquid crystal material to be non-orthogonal to the substrates when the respective signal voltage is written to the respective one of the pixel electrodes.

11. A liquid crystal display of claim 8, wherein a lower one of each pair of the pixel capacitor electrodes reflects light and defines the reflective region.

12. A liquid crystal display of claim 11, wherein the lower one of each pair of pixel capacitor electrodes is formed on a same layer as a metal electrode layer of each pixel transistor.

13. A liquid crystal display of claim 11, wherein an upper one of each pair of pixel capacitor electrodes is formed on a same layer as a semiconductor layer of each pixel transistor.

* * * * *